United States Patent
Kansal

(10) Patent No.: US 7,962,525 B2
(45) Date of Patent: Jun. 14, 2011

(54) AUTOMATED CAPTURE OF INFORMATION GENERATED AT MEETINGS

(75) Inventor: Aman Kansal, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 11/935,016

(22) Filed: Nov. 5, 2007

(65) Prior Publication Data

US 2009/0119246 A1    May 7, 2009

(51) Int. Cl.
*G06F 17/00* (2006.01)
(52) U.S. Cl. ........ 707/802; 707/706; 707/729; 707/749; 707/810
(58) Field of Classification Search .............. 707/706, 707/729, 749, 802, 810
See application file for complete search history.

(56) References Cited

U.S. PATENT DOCUMENTS

| | | | |
|---|---|---|---|
| 7,260,278 B2 * | 8/2007 | Zhang et al. .................. | 382/305 |
| 7,403,901 B1 * | 7/2008 | Carley et al. .................... | 705/2 |
| 2004/0263636 A1 | 12/2004 | Cutler et al. | |
| 2006/0206564 A1 | 9/2006 | Burns et al. | |
| 2006/0284981 A1 | 12/2006 | Erol et al. | |
| 2006/0288273 A1 | 12/2006 | Erol et al. | |
| 2007/0188901 A1 | 8/2007 | Heckerman et al. | |

FOREIGN PATENT DOCUMENTS

WO    02/013522 A2    2/2002

OTHER PUBLICATIONS

Dar-Shyang Lee, et al. Portable Meeting Recorder. ACM Multimedia 2002, Dec. 1-6, 2002, Juan Les Pins, France. http://rii.ricoh.com/~jamey/lee_ricoh_acmmm2002_publish.pdf. Last accessed Aug. 27, 2007.
Support and Enhance Your Meeting Workflows http://www.yonsoftware.com/products/features/workflow.aspx. Last accessed Aug. 27, 2007.
Ross Cutler, et al. Distributed Meetings: A Meeting Capture and Broadcasting System. Conference '00, Month 1-2, 2000, City, State. ACM    1-58113-000-0/00/0000    http://research.microsoft.com/~rcutler/pub/dm_mm02.pdf. Last accessed Aug. 27, 2007.
Changing the Way that Business Conducts Meetings http://www.yonsoftware.com/products/. Last accessed Aug. 27, 2007.
Anton Nijholt, et al. Online and Off-line Visualization of Meeting Information and Meeting Support. The Visual Computer, Springer Berlin / Heidelberg, ISSN: 017-2789, 2007. http://eprints.eemcs.utwente.nl/6991/01/TR-CTIT-06-51.pdf. Last accessed Aug. 27, 2007.
Satanjeev Banerjee, et al. Creating Multi-Modal, User-Centric Records of Meetings with the Carnegie Mellon Meeting Recorder Architecture http://www.cs.cmu.edu/~coral/publinks/mmv/04icassp-cameo.pdf. Last accessed Aug. 27, 2007.

* cited by examiner

*Primary Examiner* — Sana Al-Hashemi
(74) *Attorney, Agent, or Firm* — Turocy & Watson, LLP

(57) ABSTRACT

Meeting information is collected in an automatic or automated manner utilizing user devices among other devices likely to be present at meetings. Devices can detect the occurrence of a meeting and initiate data capture. Subsequently, aggregated data can be processed to facilitate access and/or dissemination of the data. For instance, data can be contextualized and/or indexed. Further, data can be generated in or converted to forms more suitable for information distribution (e.g., summary, points of interest . . . ).

20 Claims, 12 Drawing Sheets

AUTOMATED CAPTURE OF INFORMATION GENERATED AT MEETINGS

BACKGROUND

Meetings are a common everyday occurrence especially for members of an organization. Groups of people assemble often to discuss one or more predetermined topics. By way of example, there are status meetings, budget meetings, staff meetings, product development meetings, patent disclosure meetings, and board meetings, among many others. Meetings are viewed by organizations as an important vehicle for facilitating communication amongst group members for the purpose of disseminating knowledge, problem solving, brainstorming and/or the like. Accordingly, many spend a large portion of their time in meetings. In fact, business, meetings are so pervasive that some joke that there needs to be a meeting solely to schedule the next meeting.

Meetings can be informal or formal. Informal meetings can occur anytime or any place. For instance, these meetings can occur in a hallway upon a chance encounter or over breakfast or lunch. One distinguishing feature is the lack of planning or preparedness of participant. Formal meetings are much more organized and structured. They often occur in designated meeting or conference rooms with various equipment including whiteboards, computers, recorders, projectors, and television monitors, among other things. Of course, some meetings can include both informal and formal characteristics.

Various technologies have been developed with the goal to promote and improve the effectiveness of meetings. Presentation software was designed to help organize and present material in a series of slides including test, graphics, audio, and/or video. Teleconferencing was developed to enable remote users to participate in a meeting over the telephone. Video conferencing added to teleconferencing by also providing the ability of participates to see as well as hear one another. In furtherance thereof, some meeting rooms are custom designed and constructed with built-in cameras, microphones and the like. Alternatively, portable dedicated systems including specialized equipment can be moved from room to room. Software also exists for providing a presentation mechanism to enable remote meeting participants to easily view individuals and/or materials over the Internet. Indeed, the term webinar has recently been coined to refer to this type of web conferencing.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automated capture of information generated through meetings. More specifically, meeting details are recorded that were previously unrecorded, and for details that were in fact recorded, they are available in an easy to access context relevant to the meeting. Furthermore, sensors and hardware likely to be present at meetings are leveraged thereby making such system easier to deploy that a dedicated system that achieves a similar objective.

In accordance with one aspect of the disclosure, user devices carried by meeting participants such as cell phones, laptops, cameras, PDAs and the like are employed to collect meeting information alone or in conjunction with other meeting room devices. The devices can include components to automatically or semi-automatically detect occurrence of a meeting and initiate data capture in response thereto.

According to another aspect of the disclosure, collected meeting information can be contextualized to make such information available and easy to access in relevant contexts. Information can be associated with various contextual information beyond meeting date, time, or title, such as project, group, and activity, among others, to facilitate access to meeting information or intelligence.

In accordance with yet another aspect of the disclosure, collected meeting information can be processed for fast as well as easy dissemination and access to the information. More particularly, raw information can be converted or generated in different forms (e.g., summaries, points of interest . . . ) that expedite dissemination and comprehension of data. Further, raw and processed information can be indexed in a manner that facilitates location of meeting information.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided hereinafter pertaining to automated meeting recordation. Devices likely to be present at meetings including user devices, among others, are utilized to capture meeting information. Meeting information can be collected, aggregated, and/or further processed to facilitate access to and/or dissemination of the meeting data. In one instance, the data can be contextualized to aid location of relevant information. Additionally or alternatively, data can be generated or converted to forms more suitable for information distribution (e.g., summaries, points of interest . . . ).

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
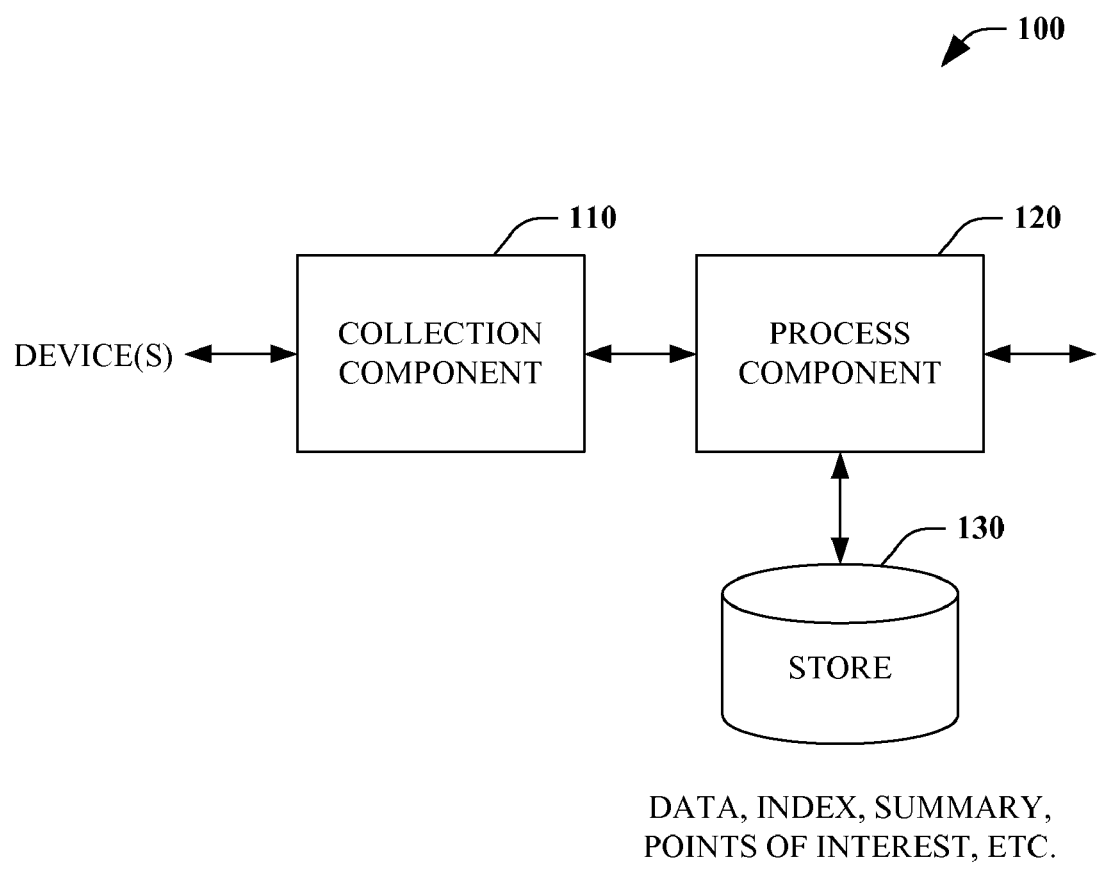
FIG. 1 is a block diagram of a meeting capture system in accordance with an aspect of the disclosed subject matter.

Referring initially to FIG. 1, a meeting capture system 100 is depicted in accordance with an aspect of the claimed subject matter. Collection component 110 collects meeting data captured by one or more devices at a meeting. The devices can correspond to mobile devices carried by meeting participants including cell phones, personal digital assistants (PDAs), laptop computers, digital recorders, digital cameras, video cameras, and smart watches, among others. Further, the collection component 110 can collect data from devices in a meeting area including but not limited to video conferencing and teleconferencing systems and components thereof. In one instance, captured data can correspond to device-sensed data including image, audio, and/or video. Furthermore, the data can include data created or utilized during a meeting such as user notes generated in a text editor or a set of slides presented at the meeting. Collected meeting data can be provided or otherwise made accessible to process component 120.

The process component 120 processes collected data to facilitate access to and/or dissemination of meeting information, among other things. In one instance, process component 120 can contextualize data. In other words, data can be associated or tagged with contextual information or metadata to aid location thereof. The usefulness of information recorded at a meeting is increased if users can access data identifying a meeting data, time, or title, for example, but also looking up data using associations such as a related project, activities, or the like. The process component 120 can also generate or convert data in a variety of forms to aid data distribution as well as comprehension. For instance, the process component 120 can generate or extract summaries or items of interest (e.g., action items, conclusions . . . ). Additionally or alternatively, the process component 110 can index the captured meeting data as well as processed meeting data utilizing the data content and/or associated metadata to facilitate expeditious location of data.

In any event, processed data can be provided by the process component 120 to computer readable store 130 for storage to enable access to such data subsequently or in substantially real-time during a meeting. In one embodiment, the store 130 can be a central repository or database management system. However, the claimed subject matter is not limited thereto.

One of the key challenges facing organizations today is that discussions from past meetings are not easily accessible to meeting participants or others who may benefit from the meeting. This has several drawbacks. First, time is wasted documenting meetings, conclusions, and follow-ups (e.g., minutes of meeting).

In addition, action items need to be manually noted by each participant. Sometimes one of the participants acts as a secretary and manually takes notes for distribution to others. However, these notes are often incomplete and usually biased toward what the secretary found important or was able to capture in parallel with participating in discussions. In many cases, some actions items are lost or forgotten.

Thirdly, knowledge developed during a meeting or imparted by more experienced participants is not easy to disseminate. For example, new solutions or modifications to business processes generated at meetings are a significant part of an organization's competitive advantage such as when solutions incorporate current market conditions. However, such information is not easily distributable within an organization to other divisions facing similar issues, new employees and/or newly acquired sub-organizations, among others.

Furthermore, detail is often missed. For example, in many cases, even though meeting participants make note of a discussion they typically do not record or are unable to record all details (e.g., product design, project implementation, solution to problem). If a missed detail becomes relevant or is otherwise needed by a meeting participant, it is either discussed at a subsequent meeting (wasting time) or the participant has to contact other participants and check if they have a record or memory of that missing information (wasted time and effort). It should be appreciated that this problem as well as others become even more severe in cases where one or more of the meeting participants leave the organization and other members of the organization need information that only the leaving members possessed.

System 100 resolves many of these issues by automating recording of various information elements involved in a meeting. Specifically, it enables recording of certain meeting details that were previously left unrecorded and for details that were in fact recorded, it makes them available in an easy to access context that is relevant to the meeting. Furthermore, hardware components including sensors and computing equipment likely to be present at a meeting are utilized to record the meeting, which is much easier than deploying a dedicated system to achieve this objective.

Figure 2:
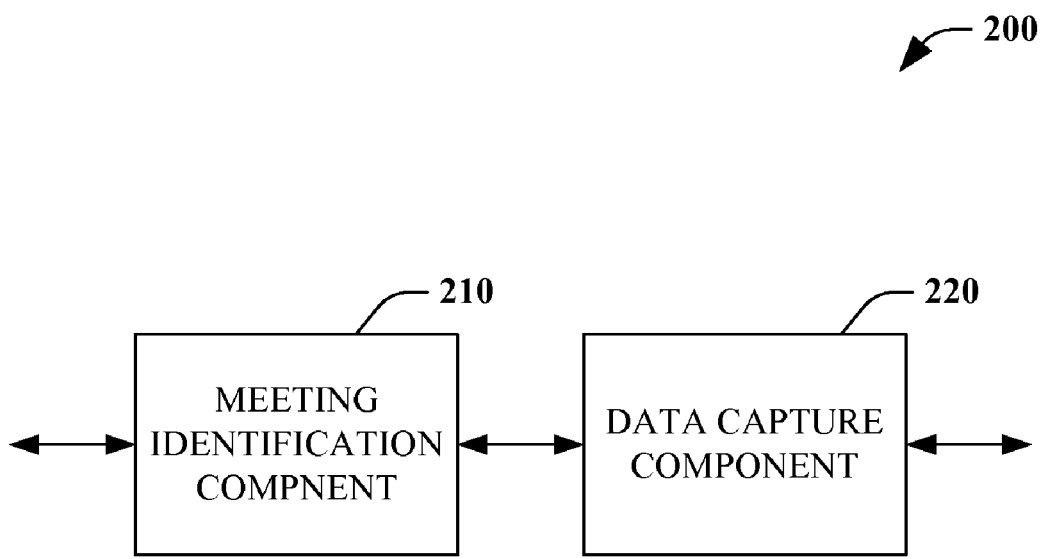
FIG. 2 is a block diagram of an information capture system in accordance with an aspect of the disclosed subject matter.

FIG. 2 illustrates an information capture system 200 according to an aspect of the claimed subject matter. The system 200 enables meeting related information to be captured in an unobtrusive manner. In accordance with one embodiment, the system 200 can be loaded onto and executed by one or more devices that may be present at a meeting. By way of example and not limitation, such devices can include cell phones, PDAs, PDA phones, video conferencing systems, laptops, digital cameras, teleconferencing systems, smart watches, and video cameras. Furthermore, the system 200 can standalone or be incorporated into another device system. For example, the system 200 can be integrated with an email or calendaring system to make it easy for users to access meeting related functionality from their calendars, where meeting time is stored in existing usage.

The system 200 includes a meeting identification component 210 that enables automatic, semi-automatic, and/or manual identification of a meeting occurrence in order to activate meeting recordation. The meeting identification component 210 can provide such functionality in a number of ways. In one instance, a meeting can be identified by accessing calendar information housed on a user device or a device user's service account. For example, if a meeting is scheduled at the current time and date, a meeting occurrence can be identified.

Additionally or alternatively, location can be utilized. If a device includes location information (e.g. global positioning system (GPS)), the meeting identification component 210 can determine if current device location matches a specified meeting location. If the locations match, a meeting is identified.

Further, the meeting identification component 210 can employ network sniffing in which network interfaces on devices (e.g., Bluetooth, Ethernet, WiFi . . . ) are employed to read machine and/or user names in packets flowing in the network near the devices. If these names resemble the machine and/or user names of people expected to be present at the meeting, the meeting identification component 210 can confirm that the meeting is indeed taking place. Where devices can communicate directly or indirectly with one another, the meeting identification component 210 can employ similar functionality to determine whether a meeting is occurring. In particular, it can attempt to match meeting participants with nearby devices and/or device users.

User prompts can also be utilized in certain situations to identify meeting occurrence or check if a meeting is occurring. For instance, when the location of a meeting accessed from a calendar event indicates it requires the user to travel and information assessed from weather services (e.g. using web services, RSS feeds . . . ) indicated bad weather, the user may be prompted. Similarly, if a device provides location information and the currently inferred location is significantly different from the meeting location, a user may be prompted.

It is to be appreciated that the various ways in which meetings can be identified by the meeting identification component 210 can be utilized alone or in combination. Further, each mechanism can be employed to either identify meeting occurrence or verify that a meeting is in fact taking place.

Identification of a meeting within a threshold value of confidence can initiate data capture via data capture component 220. The data capture component 220 can record sensed data as well as generated and/or employed application data. For instance, upon identification of a meeting the data capture component 220 can activate sensors accessible on a resident device to record the data. By way of example, if the system 200 resides on a cell phone, the device microphone can be activated to start recording audio generated during a meeting. Similarly, a web camera can be turned on to record a meeting presentation. Captured data can be tagged with metadata or identifying indicia describing a meeting (e.g., time, date, topic, participants, device name . . . ). For example, if a participant snaps a picture at a meeting, a recorded image can be tagged with meeting identifying metadata. As another example, notes typed into a text editor at a meeting can be recorded as well. The recording need not necessarily produce a duplicate copy of information generated by external applications like a text editor, but enough information is recorded to allow retrieval of the generated information.

It is also to be appreciated that meeting related information could continue to be captured after a meeting. For instance, suppose a device does not have the system 200 but was externally triggered to record information (e.g. video camera) during a meeting and is then connected to a device including the system 200. In this case, information can be captured by the data capture component 220 from the external device, if it is related to the meeting.

Figure 3:
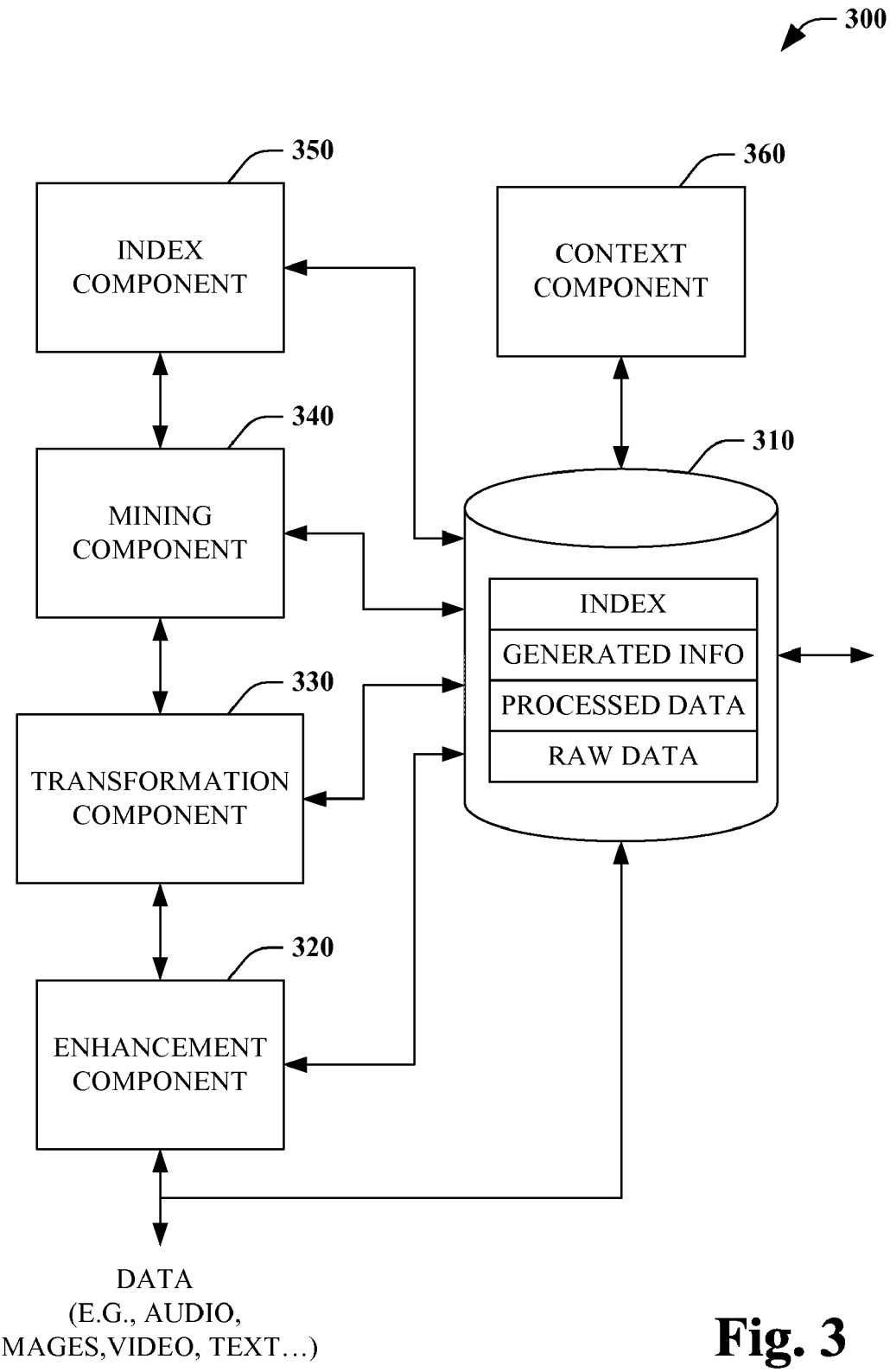
FIG. 3 is a block diagram of a data processing system in accordance with an aspect of the disclosed subject matter.

Turing to FIG. 3, a data processing system 300 is illustrated in accordance with an aspect of the claimed subject matter. Received, retrieved, or otherwise acquired data can be processed and/or saved to computer readable store 310 to enable future access or distribution. As previously mentioned, such data can include that sensed or captured by a device itself (e.g., image, audio, video . . . ) as well as user-generated data (e.g., notes, slides, graphics . . . ). Raw data can be saved to store 310 to enable later lookup and/or processing. Furthermore, various processing components described below can save processed data to the store 310 and/or acquire data from the store for processing.

The system 300 includes an enhancement component 320 to improve raw data quality. For instance, sensor data including audio, video and/or image data can include noise. The enhancement component 320 can utilize one or more signal processing techniques to reduce noise in data. While low quality data can simply be rejected, it can also be enhanced and/or utilized to improve other data quality. By way of example, where a meeting includes more than one audio recording, the recordings can be utilized to improve the quality of each other by combination, among other things. Thus, if a first recording includes a duration of audio of poor quality, a second recording over the same time period can be used to replace a portion of the first recording or otherwise utilized to enhance the signal and/or remove noise. This could be the case where the first recording is located farther away or in a noisier section of the room than the second recording.

Data can also be transformed to other formats utilizing the transformation component 330. In one instance, sensor data can be converted to text. Audio can be converted utilizing speech to text technologies. Video and images can be filtered to detect text and character recognition technologies used to convert to text. The transformation component 330 can also convert figures or drawings present in video or images to vector graphics representations of those figures. It is also to be noted that the transformation component 330 can filter data for example extracting the most relevant text or figures from images or key frames of a video.

Mining component 340 is a mechanism for extracting useful information from data. In one implementation the mining component 340 can analyze data housed in store 310 or provided by other components, and generate or extract a meeting summary and/or points of interest (e.g., activity list, to-do list, conclusions . . . ), among other things. By way of example, extracted text can be searched for key phrases that indicate information of importance to a summary or other organizational intelligence such as "In conclusion, we should . . . ," "I disagree . . . ," "To-do items are . . . ," or other action verbs identifying tasks to perform, inter alia. Users can also add to the list of such phrases know to the system based on culture and/or slang used by an organization. The text following such phrases may be used as key points for the summary. It is also to be noted that the mining component 340 can identify new key words or phrases for indexing, such as when they occur in conjunction with other known or user specified key phrases.

Raw data associated with a meeting and its associated processed versions including key phrases extracted by the mining component 340 are utilized by index component 350 to build an index that facilitates searching of meeting information. The index component 350 can utilize various known search-indexing methods. Furthermore, key words or phrases can be compared to known lists of people, groups, and/or activities, among other things to further enhance search capability. By way of example and not limitation, indexing tags and associations can be generated from assigned tags, user profile information, and/or user input.

The index component 350 or a separate context component 360 can be utilized to generate association or contextualized data. The usefulness of the information recorded at a meeting is increased if users can access it not only be looking up the meeting date, time, or title but also looking it using associations including but not limited to projects, activities, or teams. Thus, information recorded at a meeting can also be associated with related context. For example, a calendar event for a meeting can indicate an explicit association with a project. Calendar events can also identify with which project a meeting is associated, a meeting title or description, which can be discovered by the context component 360. A list of meeting participants can also be maintained and compared with lists of members of different projects to determine to which project the meeting belongs. The context component 360 can also mine recorded information itself to identify contextual information about a meeting. Further yet, a user profile can be employed for instance to determine a role or position in an organization which can lead to identification of different groups and/or activities that may be associated with a meeting. Still further yet, the context component 360 can initiate prompting of a user to indicate which projects, activities, groups, etc. associated with a meeting. It may also use inferred information from any other mechanism of determining context to suggest a list of possible associations.

It is to be noted that all processing of data can be distributed across a client and a server, for instance. Thus, various components may reside either on a client or on a server. By way of example, the context component 360 can reside on a user device. As a result, data can be contextualized prior to providing it to a server for storage and/or further processing.

In one instance, this can be useful in contextualizing data provided by external devices that may not include the same data capture functionality. When an external device is connected to a data capture enabled device, any data transferred from the external device can be check by a local context component 360 for possible relationship to one or more meetings. This can be accomplished by checking data time stamps and comparing it to meeting times, analyzing metadata associated with external information, and/or prompting a user to indicate whether transferred data is related to a meeting. In addition to external sensor data, application data can be checked for associations. For instance, if an application was started during the time of the meeting an association can be made. Additionally or alternatively, generated application data can be mined to determine or otherwise infer relationships.

It is likely that some information may be associated wrongly or not be associated with a meeting. In instances where the context component 360 is unable to determine correct associations with a high confidence, the information access can be restricted to the user device on or from which it was generated or to only people whose association with the information has been determined with high confidence. A user can also be prompted when appropriate to confirm associations and/or grant permissions to other people.

Figure 4:
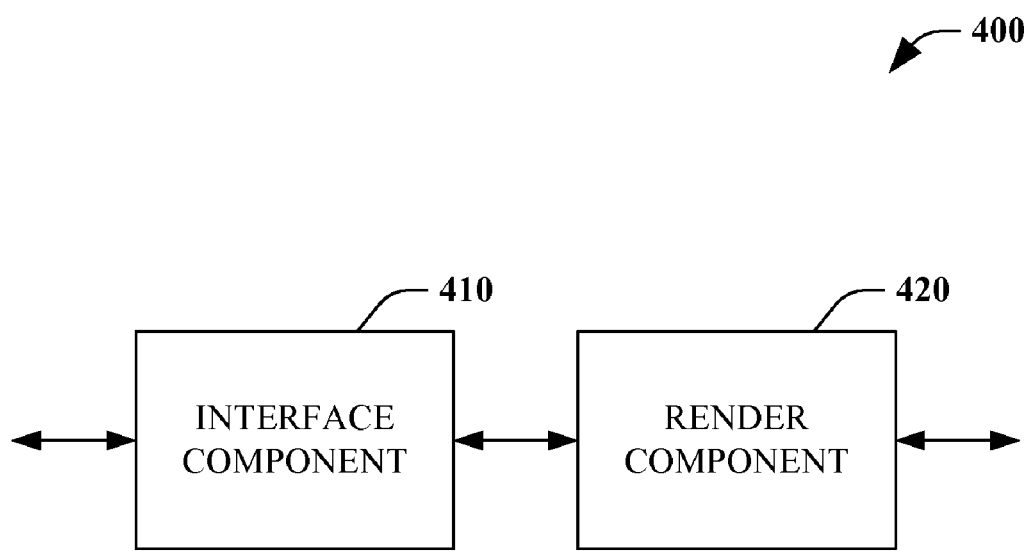
FIG. 4 is a block diagram of a data interaction system according to an aspect of the disclosure.

Turing to FIG. 4, a data interaction system 400 is illustrated in accordance with an aspect of the claimed subject matter. As previously noted, data can be saved to a store for later search and discovery. However, the claimed subject matter is not limited to subsequent database query. Rather, information can be captured and processed in real or substantially real-time and fed back to meeting participants. As shown, system 400 includes an interface component 410 to enable a device to receive, retrieve, or otherwise obtain meeting data from a remote store, for instance. Obtained meeting data can then be rendered, presented and/or displayed to a user via render component 420. In one instance, render component 420 can facilitate generation of real-time notes. By way of example, where a user takes a picture of a whiteboard figure, the interface component 410 of other user devices can acquire that picture and render component 420 can provide the ability to insert the picture into a document employed by a user to take meeting notes. Similarly, a summary or bullet point list of taking points can be generated and updated automatically. Accordingly, system 400 can either aid meeting documentation or alternatively completely automate documentation.

Figure 5:
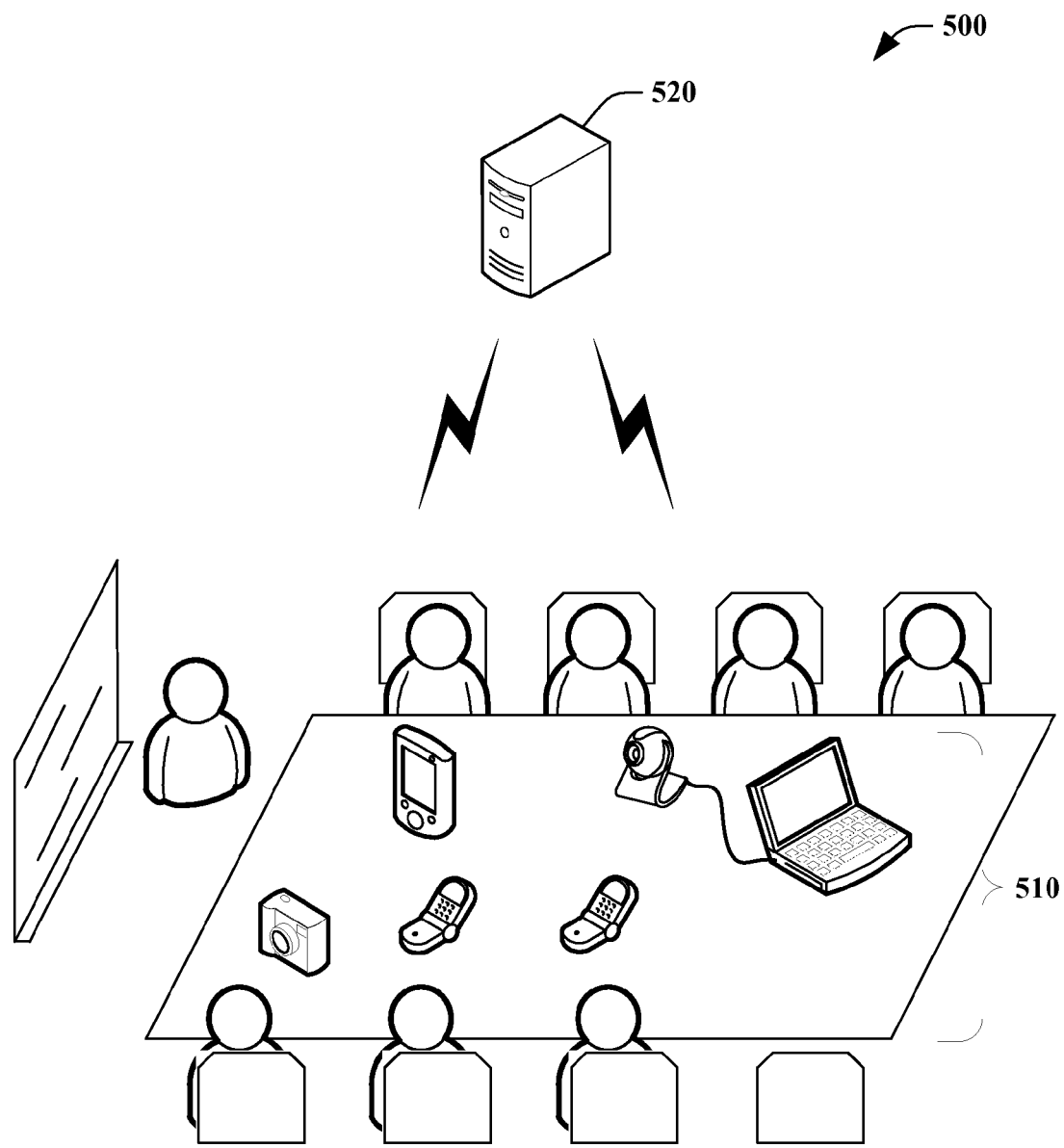
FIG. 5 depicts an exemplary scenario to aid clarity and understanding with respect to aspects of the disclosure.

Turning attention to FIG. 5, an exemplary scenario 500 is depicted to aid understanding and clarity with respect to claimed aspects. As illustrated, a plurality of individuals are meeting to discuss a particular topic. The meeting can correspond to a business meeting or classroom setting, among other things. One individual is presenting material utilizing a whiteboard while the others are observing and/or participating in discussion. At least a subset of individuals brings a number of user devices 510 to the meeting such as a cell phone, PDA, digital camera, video camera, and laptop computer.

At least some of these devices include an information capture system as previously described. Consequently, these devices can detect when a meeting is occurring and initiate meeting recordation, automatically in some cases. For instance, the cell phone and/or PDA can determine based on its location as well as calendar data that it is at a meeting and can activate its microphone to begin recording audio. If the video camera does not include the system but the laptop does, the laptop may activate the video camera upon determination that a meeting is occurring. The digital camera can be manually operated to take pictures of the whiteboard at periodic intervals. Similarly, a laptop user can employ a word processing application to manually record notes.

Upon capturing all or part of information generated at a meeting, the devices can process the information for example to extract or generate information or forms of information to facilitate dissemination of meeting intelligence (e.g. summaries, key words . . . ). The raw information and/or the processed information can be transmitted to a server 520 for further processing and/or centralized storage.

Note that network elements may not be available at the time of the meeting. For instance, the cell phone may not have coverage in the meeting room; the laptop may be disconnected from the network in the meeting room, and so on. In this case, information can be transmitted to the server 520 when connectivity is available. In addition, some captured information may be transferred later, such as photographs taken by a digital camera. All information recorded and transferred can be marked with special tags that identify the meeting as well as associations (e.g., project, person, group . . . ).

Upon receipt, a server application can store captured information and/or process the information. As previously discussed, functionality can be split in various ways across a client and server application for instance based on device processing power, network connectivity and the like. Accordingly, the server application can perform the same processing as previously attributed to the devices and/or additional processing. For instance, the server application can collect and aggregate all information with the same meeting tags and process the data in an attempt to extract and/or generate meeting intelligence in various forms including but not limited to summaries and points of interest (e.g. to-do lists, activity lists, conclusions . . . ). The server application can further generate an index of all tags associated with the information and store them in a database, for example.

Information stored by the server 520 can subsequently be utilized by meeting participants to eliminate the need for a secretary to record minutes. Although some meetings may still require manual recordation to comply with laws, automated information recordings can supplement or enhance the usefulness of manually recorded minutes. In addition, this information can be used by participants to track action items from the meeting so that no important tasks are missed. The information can also be referred to in cases where some details need to be recalled. Furthermore, since the information is stored not only associated with a meeting but other factors such as a relevant project or business unit, other team members who are part of the project but unable to attend the meeting can obtain access to the information. Still further yet, the information or parts of it can be easily made available to others within an organization or outside to disseminate intelligence amongst different teams within and organization, key external partners, and/or others.

Figure 6:
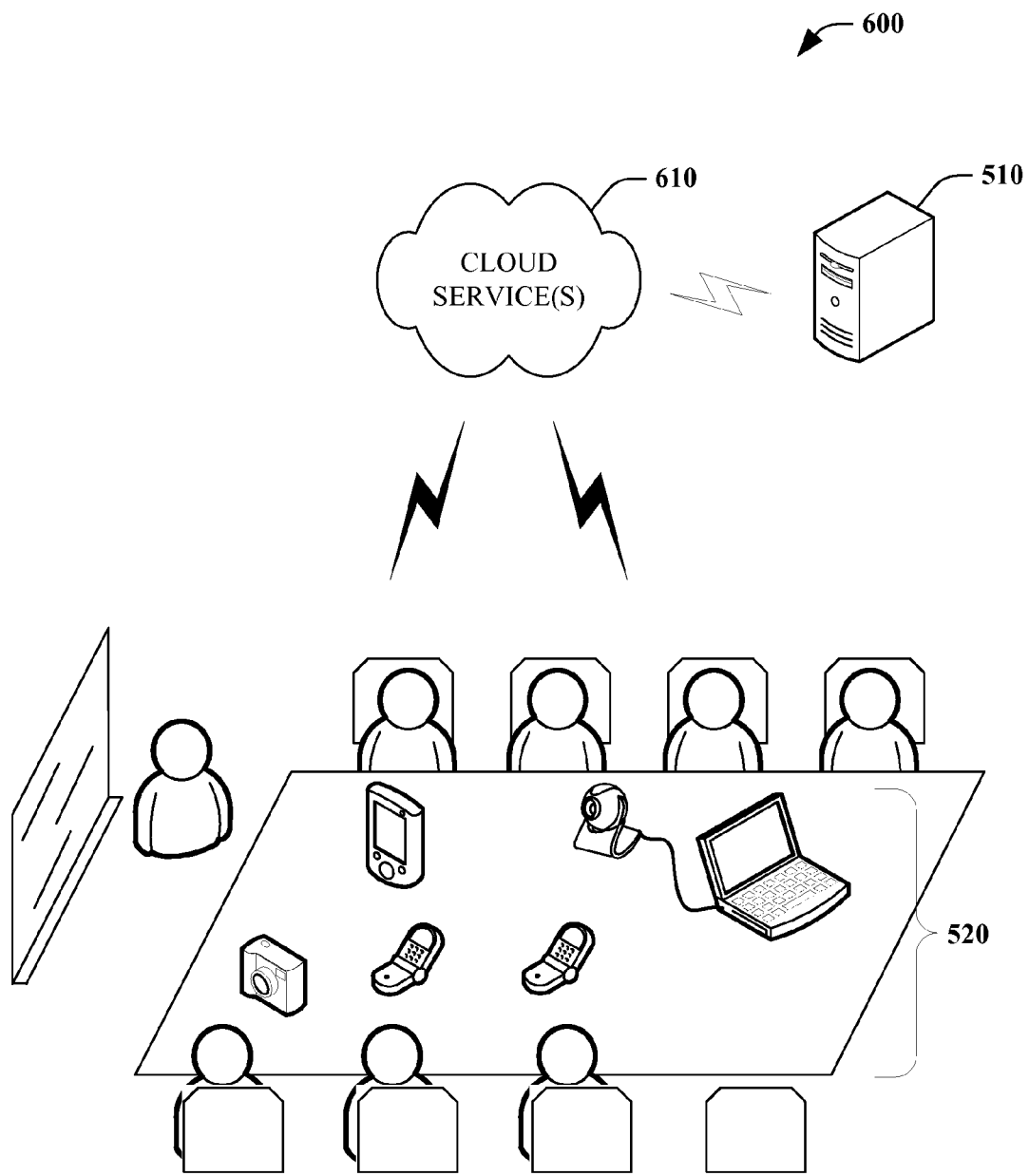
FIG. 6 depicts an exemplary scenario employing network service architecture.

Referring to FIG. 6, another exemplary scenario 600 is depicted in accordance with an aspect of the claimed subject matter. Similar to system 500 of FIG. 5, shown is a meeting amongst several individuals who have brought with them a few user devices. The previous scenario 500 illustrates an architecture in which devices communicate with a central server. Here, one or more network or cloud services 610 can be employed. The services 610 can receive information from devices 620, process the information, and transmit raw, as well as processed information to one or more servers 520 for storage. This can relieve client devices 510 and servers 520 from at least a degree of processing. Furthermore, various other supplementary services can be employed in conjunction with meeting recordation as described herein. For instance, a service could transmit location information from one user device to another to enable initiation of meeting recording. As an example, a cell phone GPS location data can be made available to a laptop.

It is to be appreciated that meetings can occur between any number of individuals for a myriad of reasons. Systems can be customized for particular types of meetings. For example, the above-described functionality can be employed in a classroom environment to automate note generation. Furthermore, if the same class is taught semester after semester, mining techniques can learn from past classes and thus enable generation of better summaries and/or outlines.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, components responsible for generation of meeting intelligence, contextualization of data and/or indexing can all employ such mechanisms.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
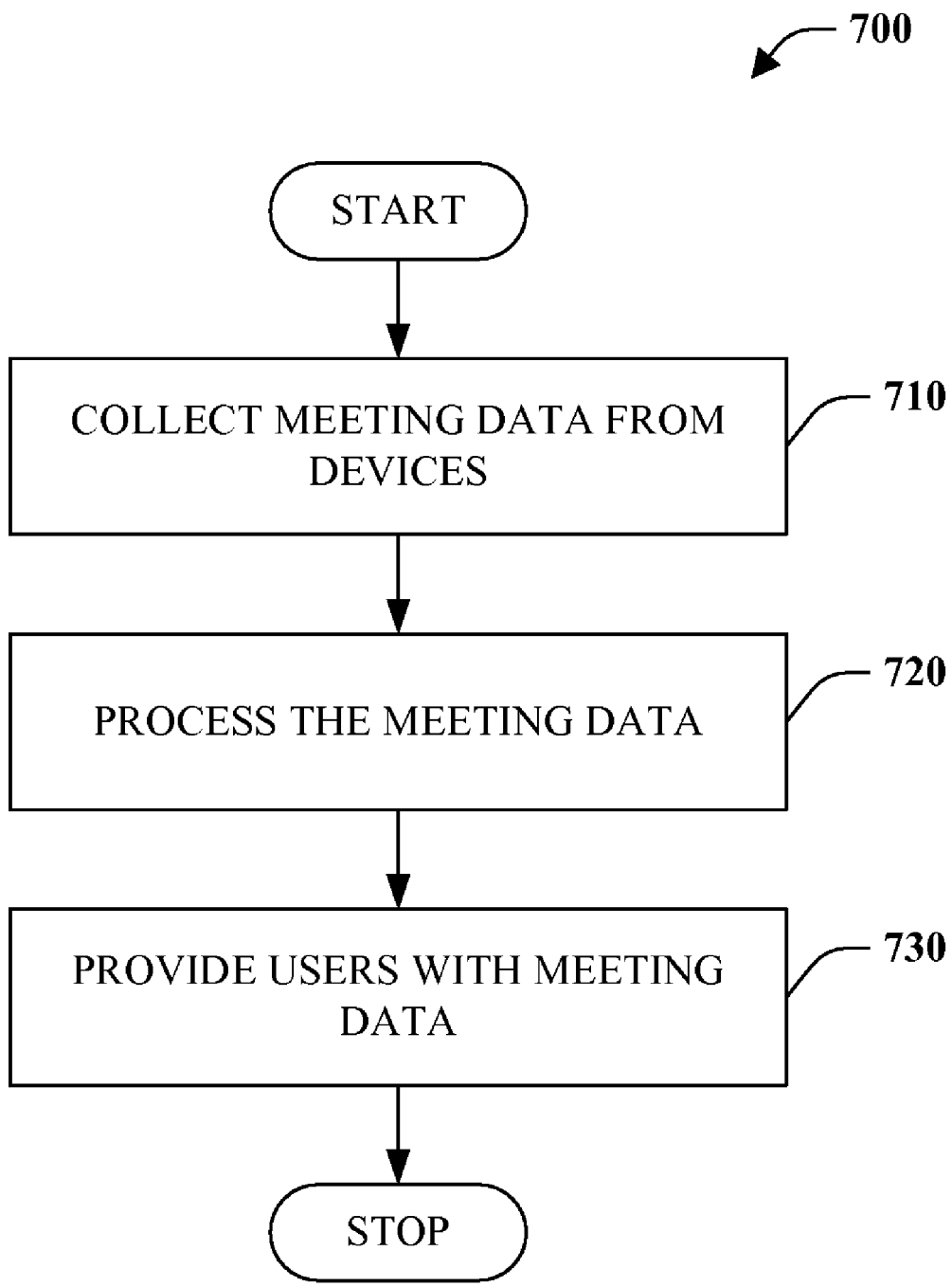
FIG. 7 is a flow chart diagram of a meeting recordation method in accordance with an aspect of the disclosure.

Referring to FIG. 7, a meeting recordation method 700 is illustrated in accordance with an aspect of the claimed subject matter. At reference numeral 710, meeting data is collected from at least one user device. A user device can correspond to any device that a user is likely to interact with such as a cell phone, PDA, computer, smart watch, video camera, and the like. Additional data can also be collect from meeting room devices such as cameras, video conference equipment and/or teleconferencing equipment. At 720, collected meeting data is processed. In one implementation, data is mined to identify keywords for subsequent indexing. Further, intelligence can be extracted from the meeting data to facilitate easy access and dissemination of meeting information. For example, a summary and/or points of interest can be extracted or generated from the data. At reference 730, raw and/or processed meeting data is provided to a user. In one instance, a user can search a meeting database for information regarding a meeting he/she missed or for additional details. Additionally or alternatively, data can be afforded to a user during a meeting to aid manual recordation or automate such a process.

Figure 8:
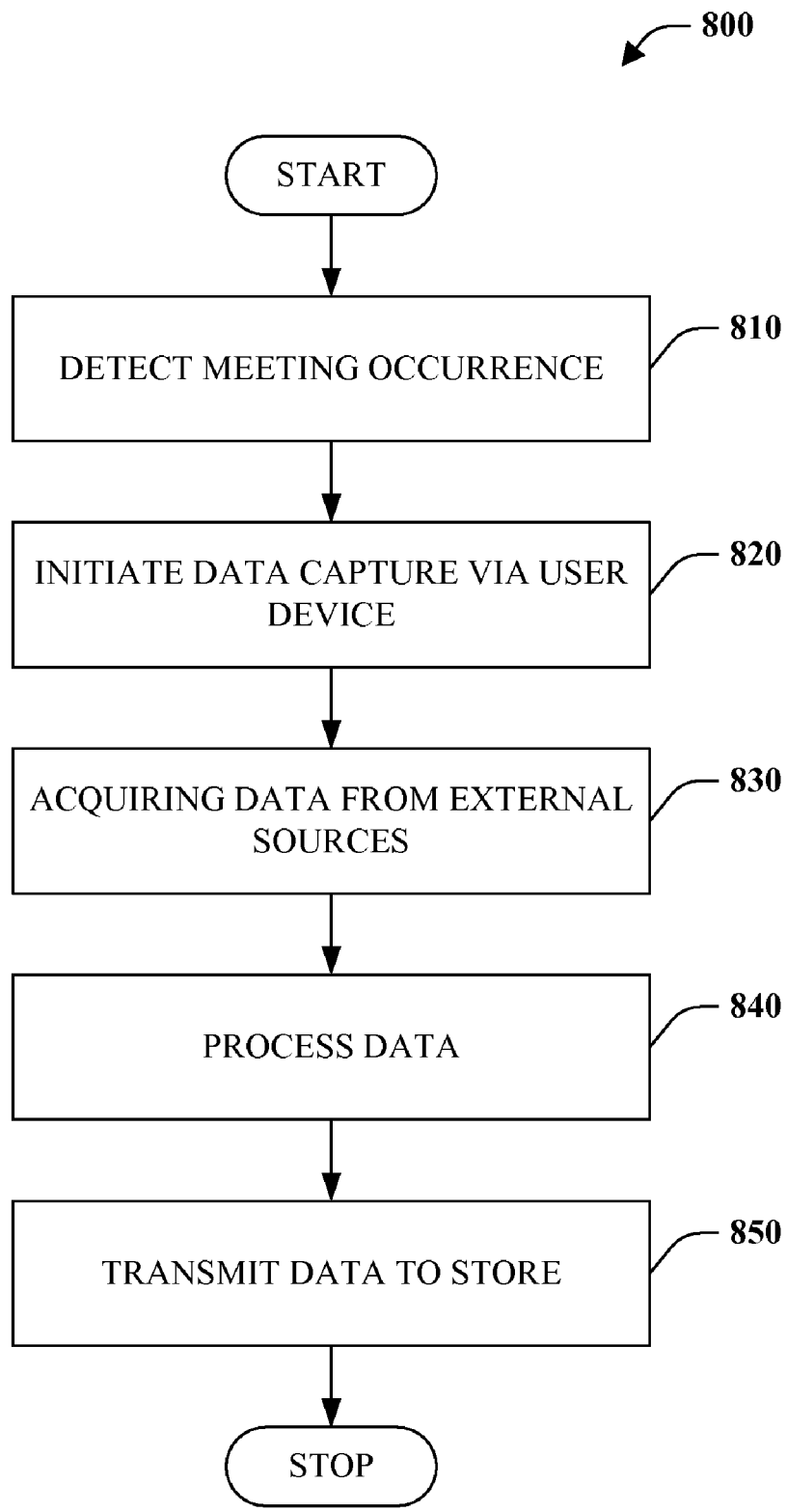
FIG. 8 is a flow chart diagram of a meeting data capture method according to an aspect of the disclosed subject matter.

FIG. 8 illustrates a meeting data capture method 800 in accordance with an aspect of the claimed subject matter. At reference numeral 810, a meeting occurrence is detected. This can be accomplished in a variety of manners such as by utilizing calendar data, location data, network sniffing, nearby device communication, and/or user prompts, among other things. Upon detection of a meeting, data capture can be initiated at numeral 820 via one or more user device, among other things. For example, a device sensor such as a microphone or camera can be activated to start recording a meeting. Additionally or alternatively, application interaction such as opening and typing in a text document or running a slide presentation can be recorded. At numeral 830, data from external devices can be acquired and captured. By way of example, where a digital camera is connected to a computer the images can be analyzed directly or via metadata to determine if they are associated with a meeting and if some they are captured or tagged as such. At reference 840, data can be processed in one or more ways to reduce noise, transform the data forms, and/or extract/generate useful information. At numeral 840, raw and/or processed data is transmitted to a data store for storage, querying, processing, distribution, or the like.

Figure 9:
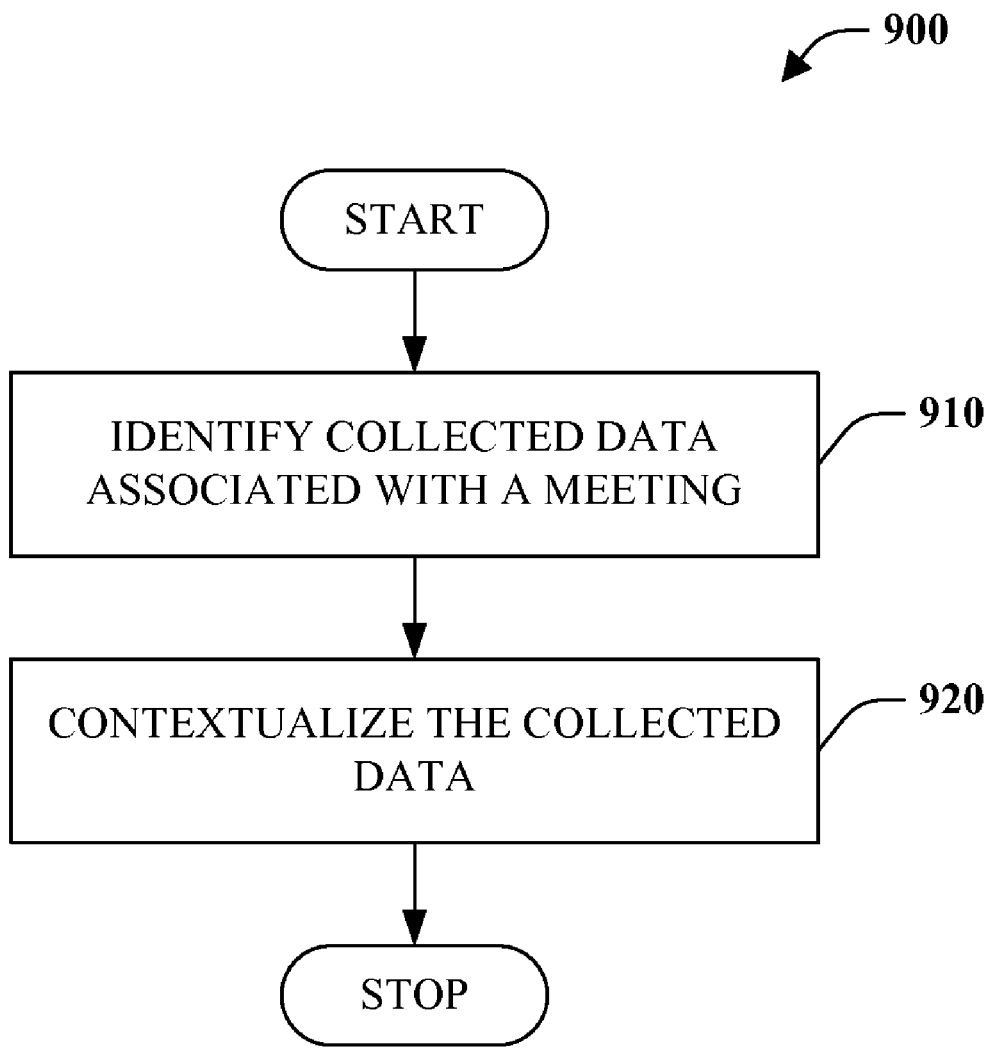
FIG. 9 is a flow chart diagram of a contextualization method in accordance with an aspect of the disclosure.

FIG. 9 is a flow chart diagram of a contextualization method 900 in accordance with an aspect of the claimed subject matter. At reference numeral 910, meeting data is acquired. Meeting data can correspond to any form of data utilized to capture a meeting including but not limited to image, text, audio or video data. At numeral 910, the acquired meeting data is contextualized. In other words, recorded data or information is made available in relevant contexts for easy access. While data can simply be looked up by meeting date, time, or title, the data can be much more useful if it is easily accessible by individuals that may benefit from the data. Various techniques can be employed to acquire information about associated projects, activities, and/or groups, among other related context. For example, a list of meeting participants can be compared against group membership to identify an associated group. Meeting information can then be associated with a particular group to facilitate access thereto via group specification. Similarly, a project may be inferred from analysis of meeting data and associate with such data to allow easy navigation of meeting information by project.

Figure 10:
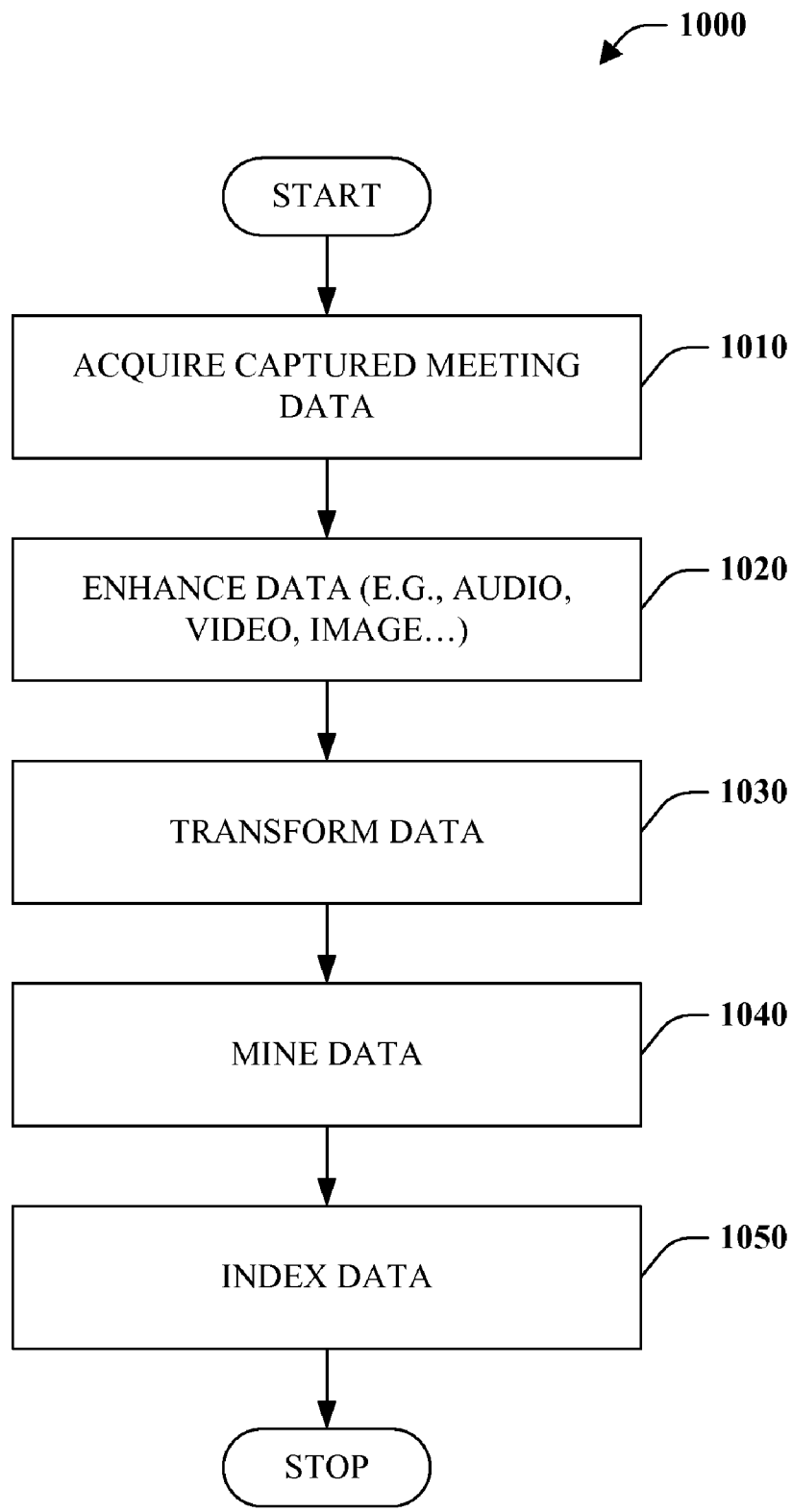
FIG. 10 is a flow chart diagram of a method of processing meeting data in accordance with an aspect of the subject disclosure.

FIG. 10 is a method of processing meeting data in accordance with an aspect of the claimed subject matter. At reference numeral 1010, captured meeting data is acquired, for example from various user and meeting room devices.

At numeral 1020, the data is enhanced. Captured data can include significant amounts of noise that can be reduced utilizing various conventional signal-processing techniques. For example, background noise associated with an audio recoding can be eliminated. Furthermore, data recorded by multiple devices can be combined or otherwise employed to enhance data. For instance, two audio recordings for the same time duration can be combined to improve signal to noise ration. Similar techniques can be employed with respect to other forms of captured data including images and video. Where enhancement is not possible with respect to poor quality data that data or a portion thereof can be removed or rejected. For instance, low quality images or video can be rejected.

At reference numeral 1030, enhanced or other meeting data can be transformed and/or filtered. In one instance, sensor data (e.g., audio, image, video . . . ) can be converted to text utilizing speech to text, character recognition, and/or image analysis technologies, among others. Further, the most relevant test, figures, and the like can be extracted from images and videos.

Raw and/or processed data can be mined at reference numeral 1040. Mining pertains generally to the extraction and/or generation of useful information from the data. In particular, the data can be searched for key terms, phrases, or the like indicative of information importance for a particular purpose (e.g., summary, action items, conclusions . . . ). For example, the phrases "In sum . . . ," or "To summarize . . . " can be important in identifying information for extraction or for use in generating a summary.

At reference numeral 1050, raw data associated with a meeting and its processed versions, including extracted key words or phrases can be utilized to generate an index to aid search for meeting information. Key words or phrases can also be compared to known lists of people, projects, groups, and/or activities to enable association with those items. This can further enhance search capability.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the claimed subject matter may be implemented as a method, apparatus or article of manufacture using standard programming and/or engineering techniques to produce software, firmware, hardware, or any combination thereof to control a computer to implement the disclosed subject matter. The term "article of manufacture" as used herein is intended refer to any computer readable device or media including computer readable instructions, program modules, data structures, and/or other data. For example, computer readable media can include but are not limited to magnetic storage devices (e.g., hard disk, floppy disk, magnetic strips . . . ), optical disks (e.g. compact disk (CD), digital versatile disk (DVD) . . . ), and flash memory devices (e.g., card, stick, key drive . . . ). Additionally it should be appreciated that a carrier wave or modulated data signal can be employed to carry and/or encode computer-readable electronic data, instructions, or the like. By way of example, and not limitation, wired media such as a wired network or direct-wired connection, and/or wireless media such as acoustic, RF (Radio Frequency), infrared and other wireless media can be utilized.

Figure 11:
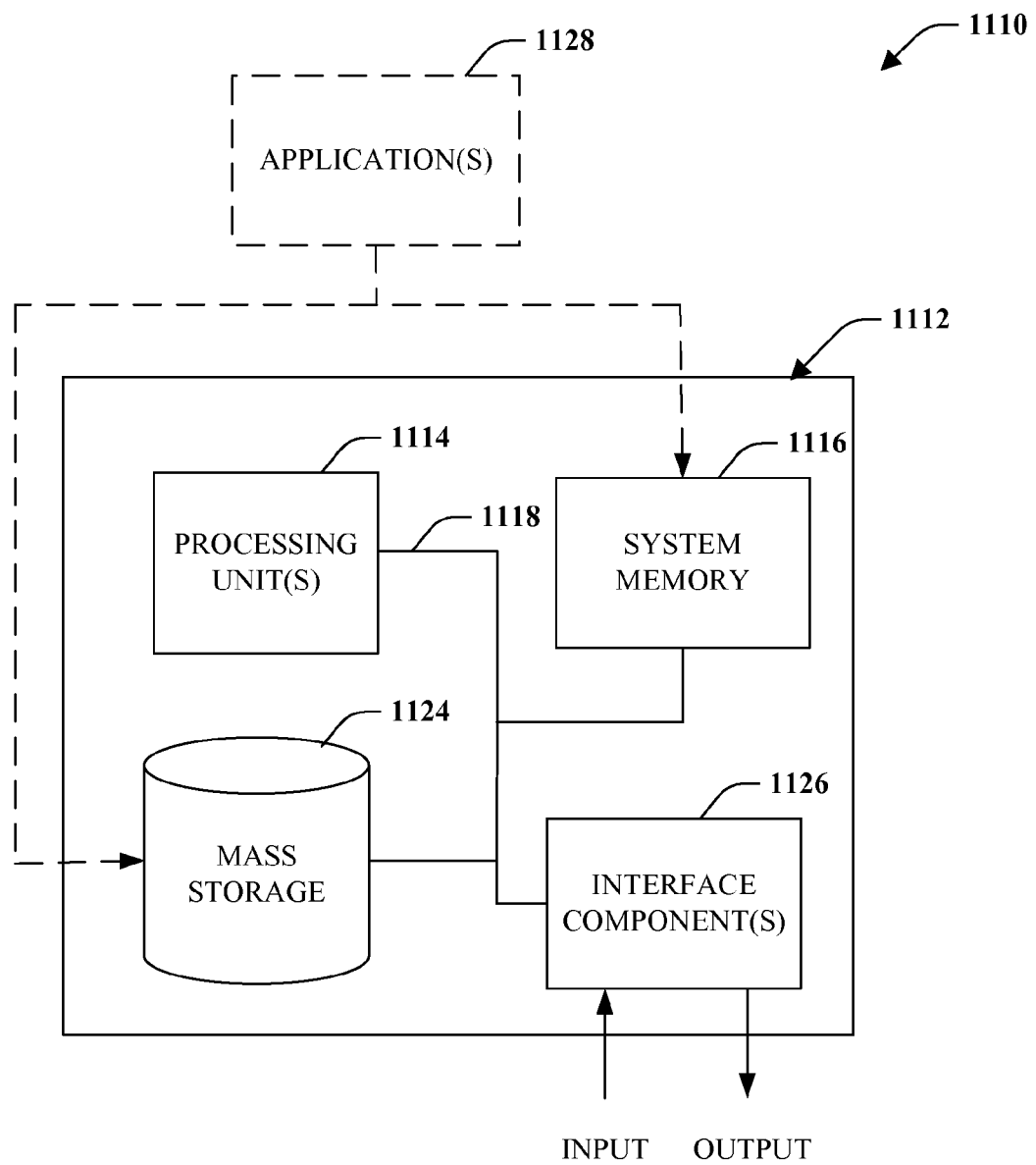
FIG. 11 is a schematic block diagram illustrating a suitable operating environment for aspects of the subject disclosure.
Figure 12:
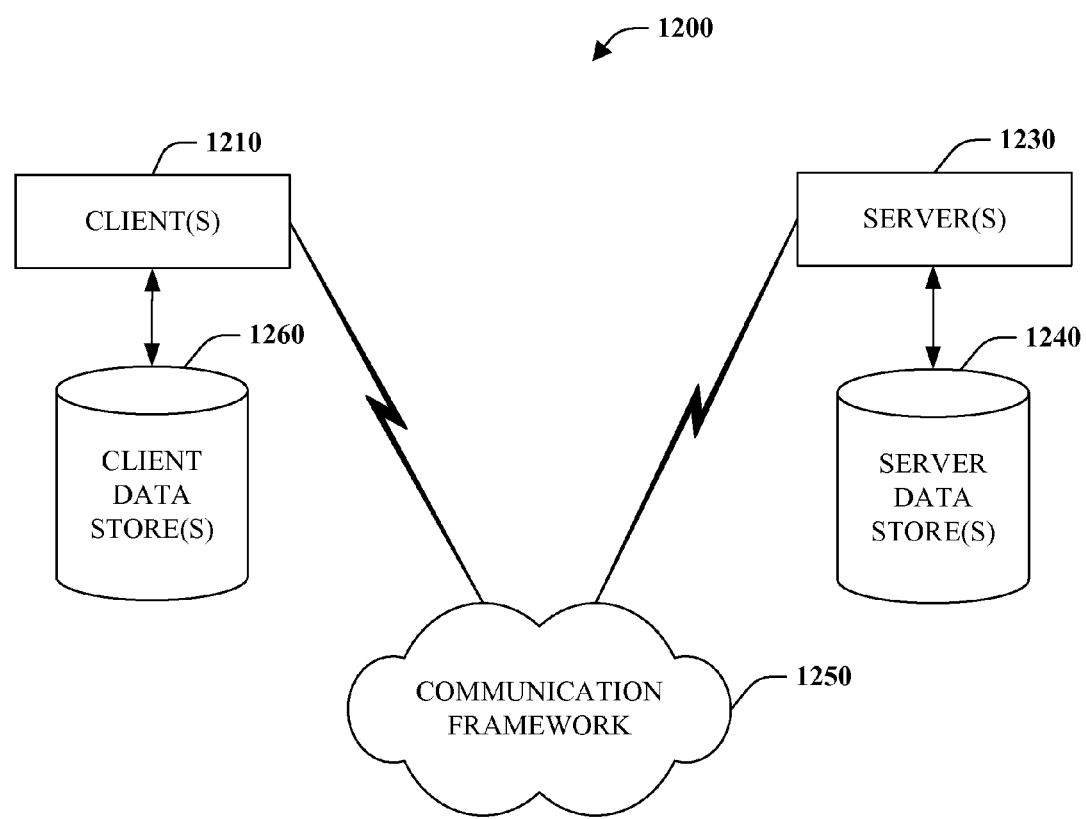
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/nonvolatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g. CRT, LCD, plasma . . . ), speakers, printers, and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect with respect to various aspects of the claimed subject matter. As previously described, meeting information capture can involve interaction between client devices 1210 and one or more servers 1230 by way of the communication framework 1250. For example, meeting information can be captured by a plurality of user devices, which can transmit raw and/or processed data to a server for further processing, storage, query response, and/or distribution. Further yet, a middle tier architecture can also be utilized to perform a substantial amount of meeting data processing, among other things.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A meeting capture system, comprising:
   a collection component configured to collect data from a plurality of user devices during a meeting; and
   a process component configured to:
      process the data to facilitate subsequent access or dissemination of the data;
      dynamically identify words or phrases in the data based, at least, on a proximity of the words or phrases to predefined keywords associated with an organization hosting the meeting; and
      generate a summary of the meeting based, at least, on extracted text following dynamically identified words or phrases in the data.

2. A computer-implemented method of information capture, the computer-implemented method comprising:
   analyzing network traffic within a predefined geographic proximity of a user device;
   determining that a meeting is occurring, based, at least, upon:
      determining that the user device is expected to be present at the meeting; and
      determining contents of the network traffic within the predefined geographic proximity of the user device; and
   initiating capture of meeting data by the user device, based, at least, on the determining that the meeting is occurring.

3. A computer-implemented method of processing meeting data, the computer-implemented method comprising:
   acquiring meeting data captured by a plurality of user devices;
   identifying calendar events for a plurality of meetings;
   identifying a project discussed at a meeting associated with the meeting data, wherein the identifying is based, at least, on the identifying a calendar event of the plurality of calendar events and participants associated with the calendar event; and processing the meeting data to enable dissemination and access to meeting information, wherein the processing comprises generating a summary of a meeting from the meeting data, the summary including the project discussed at the meeting.

4. The meeting capture system of claim 1, wherein the process component is further configured to contextualize the data based, at least, on one or more of a project, activity or team associated with the meeting.

5. The meeting capture system of claim 1, wherein the process component is further configured to index the data.

6. The meeting capture system of claim 1, wherein the process component is further configured to generate points of interest from the data, wherein the points of interest include at least one of conclusions from the meeting or a to-do list resultant from the meeting.

7. The meeting capture system of claim 1, wherein the data includes device sensor data captured by at least one of a microphone or a camera.

8. The meeting capture system of claim 1, wherein the collection component is further configured to collect data from meeting room devices.

9. The meeting capture system of claim 1, wherein the user devices are configured to automatically detect the occurrence of the meeting and initiate capture of the data.

10. The meeting capture system of claim 1, wherein the process component is configured to provide the data to user devices during the meeting.

11. The computer-implemented method of claim 2, wherein the determining that the user device is expected to be present at the meeting comprises:
   identifying a geographical location of the user device, based, at least, on the analyzing the network traffic; and
   comparing the geographical location of the user device with a geographical location of the meeting;
   and determining that the meeting is occurring based, at least, on the geographical location of the user device substantially matching or being within a predefined geographical distance from the geographical location of the meeting.

12. The computer-implemented method of claim 2, further comprising generating a user prompt to indicate whether the meeting is occurring.

13. The computer-implemented method of claim 2, further comprising:
   determining a location of the user device approximately at the time of the meeting;
   determining a location of the meeting; and
   transmitting a prompt to the user device approximately at the time of the meeting based, at least, on the determining that the meeting is occurring and determining that the location of the meeting differs substantially from the location of the user device.

14. The computer-implemented method of claim 2, further comprising transmitting the meeting data to a central repository.

15. The computer-implemented method of claim 2, further comprising:
   acquiring data from an external device connected to the user device; and
   identifying the data from the external device related to the meeting.

16. The computer-implemented method of claim 2, wherein the analyzing the contents of the network traffic within the predefined geographic proximity of the user device comprises:
   analyzing packet information identifying a plurality of devices within the predefined geographic proximity of the user device; and
   determining whether the plurality of devices within the predefined geographic proximity of the user device are associated with participants expected to be present at the meeting,
      wherein the participants expected to be present at the meeting is determined by analyzing a roster of meeting participants, and
      wherein the determining that the meeting is occurring comprises determining that the participants expected to be present at the meeting are associated with the plurality of devices within the predefined geographic proximity of the user device.

17. The computer-implemented method of claim 3, further comprising extracting points of interest from the meeting data.

18. The computer-implemented method of claim 3, further comprising indexing raw or processed data to locate the meeting information.

19. The meeting capture system of claim 7, wherein the data includes application data generated or utilized during the meeting.

20. The computer-implemented method of claim 11, wherein the geographical location of the user device is specified as a plurality of global positioning system (GPS) coordinates.

* * * * *